US007052796B2

(12) United States Patent
Sabin et al.

(10) Patent No.: US 7,052,796 B2
(45) Date of Patent: May 30, 2006

(54) EXTERNALLY MANIFOLDED MEMBRANE BASED ELECTROCHEMICAL CELL STACKS

(75) Inventors: Paul Sabin, Westford, MA (US); Paul Osenar, Needham, MA (US); Peter Rezac, Marlborough, MA (US)

(73) Assignee: Protonex Technology Corporation, Marlborough, MA (US)

( * ) Notice: Subject to any disclaimer, the term of this patent is extended or adjusted under 35 U.S.C. 154(b) by 0 days.

(21) Appl. No.: 10/789,385

(22) Filed: Feb. 27, 2004

(65) Prior Publication Data
US 2004/0247982 A1    Dec. 9, 2004

Related U.S. Application Data

(60) Provisional application No. 60/450,817, filed on Feb. 27, 2003.

(51) Int. Cl.
*H01M 8/02* (2006.01)
(52) U.S. Cl. .................................................. 429/35
(58) Field of Classification Search ............... 429/26, 429/30, 34–36, 38; 204/255–258, 246, 270, 204/277, 278
See application file for complete search history.

(56) References Cited

U.S. PATENT DOCUMENTS

| 4,476,197 A | * | 10/1984 | Herceg ......................... 429/32 |
| 6,689,504 B1 | * | 2/2004 | Matsumoto et al. .......... 429/39 |
| 2002/0172852 A1 | * | 11/2002 | Frank et al. .................. 429/34 |

FOREIGN PATENT DOCUMENTS

| WO | WO 9620509 A1 | * | 7/1996 |
| WO | WO-02/43173 A1 | | 5/2002 |
| WO | WO-03/036747 A1 | | 5/2003 |
| WO | WO-03/092096 A2 | | 11/2003 |
| WO | WO-04/047210 A3 | | 6/2004 |

* cited by examiner

*Primary Examiner*—Gregg Cantelmo
(74) *Attorney, Agent, or Firm*—Linda M. Buckley; Christine C. O'Day; Edwards Angell Palmer & Dodge LLP

(57) ABSTRACT

The present invention provides membrane cassettes and stacks thereof which are suitable for a use in a variety of electrochemical applications. The invention further provides membrane cassettes which comprise one or more external manifolds which deliver reagents and/or coolant to one or more reactant or coolant flow fields of the membrane cassettes. In certain preferred embodiments, the invention provides cassettes and stacks which are suitable for use in fuel cell applications.

42 Claims, 9 Drawing Sheets

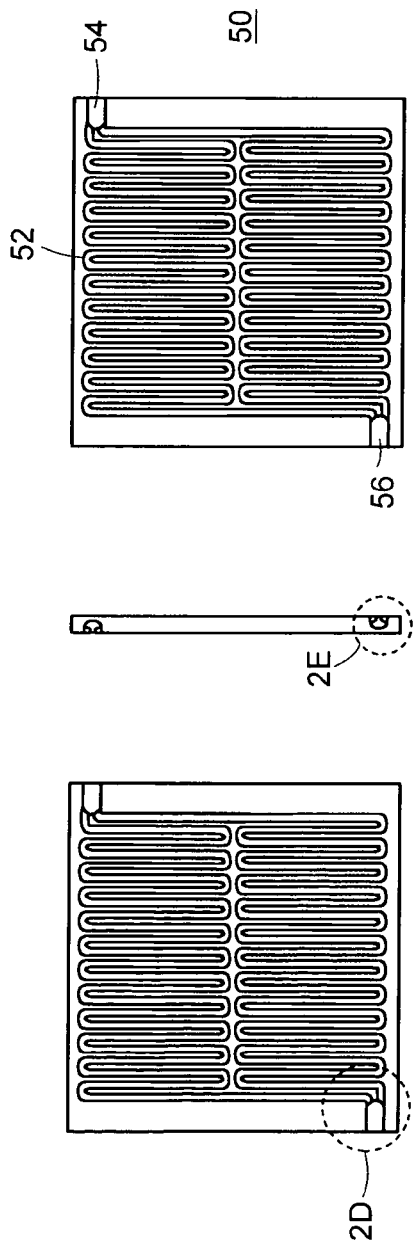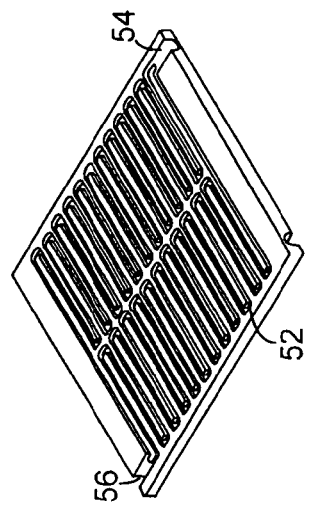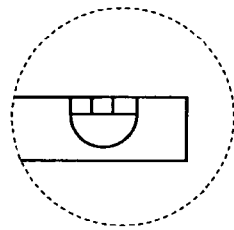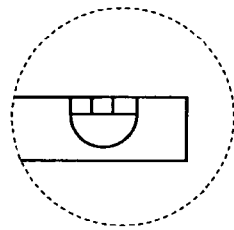

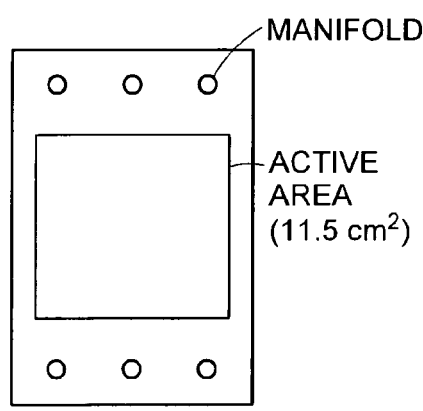 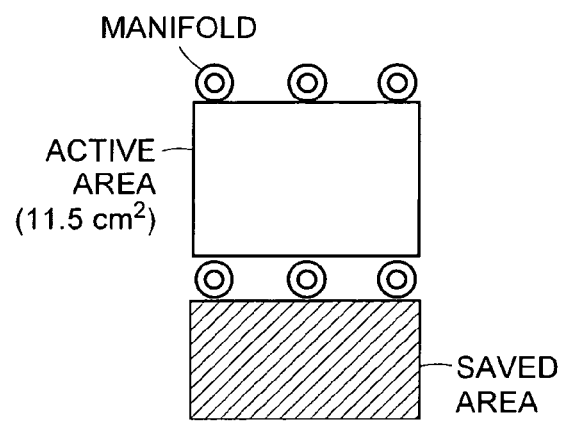
GENERATION 3
CURRENT
FOOTPRINT
FIG. 8A
GENERATION 4
TARGET
FOOTPRINT
FIG. 8B

EXTERNALLY MANIFOLDED MEMBRANE BASED ELECTROCHEMICAL CELL STACKS

This application claims the benefit of U.S. Provisional Patent Application 60/450,817, filed Feb. 27, 2003, which application is incorporated by reference.

FIELD OF INVENTION

This invention relates to electrochemical stacks having external manifold assemblies which have been encapsulated by a resin, and more particularly, to proton exchange membrane fuel cell stacks comprising an external manifold.

BACKGROUND OF THE INVENTION

Membrane based electrochemical cells, and particularly, proton exchange membrane (PEM) fuel cells are well known. PEM fuel cells convert chemical energy to electrical power with virtually no environmental emissions and differ from a battery in that energy is not stored, but derived from supplied fuel. Therefore, a fuel cell is not tied to a charge/discharge cycle and can maintain a specific power output as long as fuel is continuously supplied. Significant funds have been invested in fuel cell research and commercialization, indicating that the technology has considerable potential in the marketplace. However, the high cost of fuel cells when compared to conventional power generation technology deters their widespread use. The cost of fabricating and assembling fuel cells can be significant, due to the materials and labor involved. Indeed, as much as 85% of a fuel cell's cost can be attributed to manufacturing.

Traditionally, one of the problems of using internally manifolded stacks in fuel cells and other electrochemical applications, is the area that is sacrificed in sealing around the internal manifolds. One remedy is to locate some or all of the manifolds external to the stack. Several examples exist but all suffer from difficulties in sealing between the manifold and the stack. As in traditional stacks, sealing is typically accomplished with gaskets and compression. Unfortunately, gasket/compression based seals have a number of inherent drawbacks, including a sensitivity to thermal cycling, requirements of uniform compression and associated hardware, high tolerance parts, and delicate assembly requirements.

In general, a single cell PEM fuel cell consists of an anode and a cathode compartment separated by a thin, ionically conducting membrane. This catalyzed membrane, with or without gas diffusion layers, is often referred to as a membrane electrode assembly ("MEA"). Energy conversion begins when the reactants, reductants and oxidants, are supplied to the anode and cathode compartments, respectively, of the PEM fuel cell. Oxidants include pure oxygen, oxygen-containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce protons, which migrate across the membrane to the cathode. At the cathode, the protons react with the oxidant. The overall electrochemical redox (reduction/oxidation) reaction is spontaneous, and energy is released. Throughout this reaction, the PEM serves to prevent the reductant and oxidant from mixing and to allow ionic transport to occur.

Current state of the art fuel cell designs comprise more than a single cell, and in fact, generally combine several MEAs, flow fields and separator plates in a series to form a fuel cell "stack"; thereby providing higher voltages and the significant power outputs needed for most commercial applications. Flow fields allow for the distribution of the reactants through the fuel cell and are typically separate from the porous electrode layers within the fuel cell. Depending on stack configuration, one or more separator plates may be utilized as part of the stack design to prevent mixing of the fuel, oxidant and cooling streams within the fuel cell stack. Such separator plates can also provide structural support to the stack.

Bipolar plates perform the same function as an oxidant flow field, fuel flow field and separator plate in combination and are often used in the design of fuel cells as their use can reduce the number of components required in the functioning fuel cell. These bipolar plates contain an array of channels formed in the surface of the plate contacting an MEA which function as the flow fields. The lands conduct current from the electrodes while the channels between the lands serve to distribute the reactants utilized by the fuel cell and facilitate removal of reaction by-products, such as water. Fuel is distributed from the fuel inlet port to the fuel outlet port, as directed by the channels, on one face of the bipolar plate, while oxidant is distributed from the oxidant inlet port to the oxidant outlet port, as directed by the channels, on the opposing face of the bipolar plate, and the two faces are not connected through the plate. The particular design of the bipolar plate flow field channels may be optimized for the operational parameters of the fuel cell stack, such as temperature, power output, and gas humidification. Ideal bipolar plates for use in fuel cell stacks are thin, lightweight, durable, highly conductive, corrosion resistant structures such as carbon/polymer composites or graphite. In the fuel cell stack, each bipolar plate serves to distribute fuel to one MEA of the stack through its fuel flow field face while distributing oxidant to a second MEA through the its opposite oxidant flow field face. A thin sheet of porous paper, cloth or felt, usually made from graphite or carbon, may be positioned between each of the flow fields and the catalyzed faces of the MEA to support the MEA where it confronts grooves in the flow field to conduct current to the adjacent lands, and to aid in distributing reactants to the MEA. This thin sheet is normally termed a gas diffusion layer ("GDL"), and can be incorporated as part of the MEA.

Of necessity, certain stack components, such as the GDL portion of the MEA, are porous in order to provide for the distribution of reactants and byproducts into, out of, and within the fuel cell stack. Due to the porosity of elements within the stack, a means to prevent leakage of any liquid or gases between stack components (or outside of the stack) as well as to prevent drying out of these porous elements due to exposure to the environment is also needed. To this end, gaskets or other seals are usually provided between the surfaces of the MEA and other stack components and on portions of the stack periphery. These sealing means, whether composed of elastomeric or adhesive materials, are generally placed upon, fitted, formed or directly applied to the particular surfaces being sealed. These processes are labor intensive and not conducive to high volume manufacturing, thereby adding to the high cost of fuel cells. Additionally, the variability of these processes results in poor manufacturing yield and poor device reliability.

Fuel cell stacks may also contain humidification channels within one or more of the coolant flow fields. These humidification channels provide a mechanism to humidify fuel and oxidants at a temperature as close as possible to the operating temperature of the fuel cell. This helps to prevent dehydration of the PEM as a high temperature differential between the gases entering the fuel cell and the temperature of the PEM causes water vapor to be transferred from the PEM to the fuel and oxidant streams.

Fuel cell stacks range in design depending upon power output, cooling, and other technical requirements, but may utilize a multitude of MEAs, seals, flow fields and separator plates, in intricate assemblies that result in manufacturing difficulties and further increased fuel cell costs. These multitudes of individual components are typically assembled into one sole complex unit. The fuel cell stack is formed by compressing the unit, generally through the use of end plates and bolts although banding or other methods may be used, such that the gaskets seal and the stack components are held tightly together to maintain electrical contact there between. These conventional means of applying compression add even more components and complexity to the stack and pose additional sealing requirements.

Various attempts have been made in the fuel cell art to address these deficiencies in fuel cell stack assembly design and thereby lower manufacturing costs. However, most still require manual alignment of the components, active placement of the sealing means and/or a multi-step process, each of which presents notable disadvantages in practice. See, e.g., the processes described in U.S. Pat. No. 6,080,503, to Schmid et al., U.S. Pat. No. 4,397,917, to Chi et al., and U.S. Pat. No. 5,176,966, to Epp et al.

Additionally, in traditional fuel cell cassettes, two types of MEAs dominate; MEAs in which 1) the membrane extends beyond the borders of the gas diffusion layers, and 2) gasket materials are formed into the edges of the MEA itself with the membrane and GDLs approximately of the same size and shape (see, e.g., U.S. Pat. No. 6,423,439 to Ballard). In the first type, separate gaskets are used to seal between the membrane edge extending beyond the GDL and the other part of the stack (bipolar plates). In the second type, the gasket of the MEA seals directly to the other parts of the stack. Each of these methods requires compression to make a seal. These compressive-based seals require that all the components in the stack have high precision such that a uniform load is maintained. MEA suppliers have become accustomed to supplying the MEA formats above.

Still other attempts have been made to improve upon fuel cell design and performance. For instance, U.S. Pat. No. 4,212,929 describes an improved sealing method for fuel cell stacks. That patent reports a sealing system which utilizes a polymer seal frame clamped between the manifold and the stack. As described, the seal frame moves with the stack and the leak rate associated with a typical manifold seal is reduced during compression. U.S. Pat. No. 5,514,487 and U.S. Pat. No. 5,750,281 both describe an edge manifold assembly which comprises a number of manifold plates. The plates are mounted on opposite sides of the fuel cell stack and function in such a way to selectively direct the reactant and coolant streams along the perimeter of the stack. While these designs offer limited improvements to other conventional assemblies, they are generally unsuitable for high-volume manufacture.

Recognizing these and other deficiencies in the art, we have developed a series of innovative methods for sealing manifold ports within the stack or a module thereof, as well as methods for sealing the stack or module periphery that are less labor intensive and more suitable to high-volume manufacturing processes (see World Publication WO 03/036747, incorporated herein by reference). That publication discloses a 'one-shot' assembly of fuel cell stacks (and other electrochemical devices) in which all of the component parts are assembled into a mold without gaskets. A resin is introduced into the mold and this resin selectively penetrates certain portions of the assembly either by resin transfer molding or injection molding techniques. Upon hardening, that resin seals the components and defines all the manifold channels within the stack. The net effect is to replace the gaskets of the traditional stack with adhesive based seals, introduced after the assembly of the components.

We also have previously described fuel cells having an MEA in which the GDL and membrane were more or less of the same general outline as each other and of the overall stack profile (see World Publication WO 03/092096 A2, incorporated herein by reference). The major advantage of this technique is the ability to directly use a roll-to-roll MEA without having to do any post processing. However, a substantial portion of the cross-section of each MEA is used for sealing the various manifold openings and periphery of the stack such that only about 50% of the cell cross section is used for the electrochemical reaction.

We also have developed membrane-based electrochemical cells, and more particularly, PEM fuel cell stacks which comprise one or more composite MEAs having a molded gasket about the periphery. The gasket portion of the composite MEA has one or more features capable of regulating the flow of sealant during sealing processes (see International Application PCT/US03/37127, incorporated herein by reference).

In another previous patent application, we have reported on an innovative fuel cell stack design which assembles together individual modules to form a fuel cell stack of requisite power output where each module permanently binds a number of unit cells together (see World Publication WO 02/43173, incorporated herein by reference).

Despite even our own advancements over the prior the art, we have recognized that further improvements can be made to the technology. One improvement, for example, would be to utilize a more significant portion of the total MEA area for the electrochemical process. For instance, with particular reference to those fuel cell stacks which include an internal manifold design, a certain cross-section of the cassette must be utilized for sealant channels and reactant/coolant manifolds; thus, that potentially active area is necessarily sacrificed. It also would be desirable to provide an improved fuel cell stack design that is less complex, more reliable, and less costly to manufacture. Additionally, it would be highly desirable to provide improved fuel cell stacks having reduced weight and size and (as noted above) in which a greater percent of the total MEA surface area is available for use in the electrochemical reaction occurring within the stack, e.g., available for catalyst area and proton transfer.

SUMMARY OF THE INVENTION

The present invention provides notable improvements over conventional fuel cells and related processes, including those described above. In particular, the present invention provides an externally manifolded fuel cell stack and an improved method of combining reactant flow fields, membrane electrode assemblies and reactant manifolds into a fuel cell stack cassette, including those stacks utilizing bipolar plates. Each sealed stack module, referred to herein as a "fuel cell cassette" is an assembly of fuel cell components which has bonded reactant flow fields, membrane electrode assemblies and external manifolds for delivery/removal of reactants and products and is sealed to form a self-contained unit. These fuel cell cassettes may be designed to achieve standardized specifications.

The novel design of the externally manifolded electrochemical cassettes of the invention results in a larger percentage of the MEA surface area being utilized for the electrochemical reaction and smaller cassettes (e.g., overall cassette size and weight) for a given cassette capacity. The cassette design provided herein simplifies the manufacture and assembly of the components of the cassette. In accordance with the invention, the active surface area of the cassettes is increased significantly. In particular, the separator plates (or bipolar plates) and MEAs do not require any holes or other apertures extending through the thickness thereof as is the case with fuel cell assemblies utilizing internal manifolding. Additionally, the MEA does not require a separate step to incorporate an edge gasket. Cassettes of the invention comprise a preformed external manifold which is manufactured or assembled such that the ports of the manifold can mate with corresponding peripheral openings in the assembled stacks of separator plates, flow fields, and MEA to form the cassette.

Cassettes of the invention include one or more plates comprising one or two reagent flow fields having at least one and preferably two openings to each reagent flow field about the periphery of the plate. More specifically, the plates comprise at least one and preferably two openings per reagent flow field which are capable of forming a fluid tight seal with a port of an external manifold when the stack is encapsulated with a resin. Preferably, the peripheral openings of the flow fields or plates and the ports of the manifold are shaped such that they facilitate stack assembly and formation of a fluid tight seal when pressure or vacuum is applied during resin encapsulation.

The fuel cells of the invention offer improved corrosion resistance and increased operation lifetime due, in part, to spatial separation of the collector/end plates from reagents manifolds. The external manifolds deliver the fuel and oxidant to the reagent flow fields through a manifold that is segregated from the collector plates and composite MEA. The corrosion of the current collectors, which are formed from a conductive metal or metal alloy, is prevented by isolating reagents capable of oxidizing or otherwise reacting with the current collectors to the external manifolds and the flow fields to which the manifolds deliver material. Similarly, separating the reagent manifolds from the MEA prevents exposing both surfaces of the MEA to the reagents flowing through the manifolds and thus prevents cross-cell potential problems associated with many conventional fuel cell designs. In addition, contact between the MEA and the coolant fluid is avoided.

Any conventional MEA is suitable for use in the fuel cell stacks of the present invention. Moreover, square, circular, rectangular or other regular shaped MEA having nominally the same cross section as the reagent flow field plates or bipolar plates are suitable for use in the fuel cell stacks of the present invention. Composite MEAs are suitable for use in the cells of the invention without additional modification, e.g., additional openings in the MEA structure or incorporation of a non-conductive gasket are not required. Incorporation of a substantially homogenous composite MEA which has substantially the same cross-section as the flow fields and/or separator plates maximizes the portion of the MEA available for use in electrochemical reactions.

The improved fuel cell stack of the present invention can be manufactured from conventional fuel cell components and can utilize both injection molding and vacuum assisted resin transfer molding, and pressure assisted resin transfer molding processes.

The present invention allows for the fabrication of fuel cell stacks with a minimum of labor, thereby dramatically reducing their cost and allowing for process automation. In addition, in the present invention the ports are sealed by adhesion of the sealant to the fuel cell components, not by compression of the endplates or other means of compression. This reduces the compression required on the final stack, thus improving the reliability of the seals, improving electrical contact and allowing for the use of a wider variety of resins. Further, end plates may be molded into the fuel cell cassette thereby producing an entire stack (e.g., fuel cell cassette and end plates) in one step.

Related aspects of the invention are discussed infra.

BRIEF DESCRIPTION OF THE DRAWINGS

FIG. 2 is a schematic diagram of a bipolar plate having two flow fields and apertures suitable for sealing with an external manifold;

FIGS. 8A–B is a side by side comparison of the cross-section of the externally manifolded fuel cell of the invention compared to an internally manifolded and gasketed fuel cell assembly.

DETAILED DESCRIPTION OF THE INVENTION

Figure 1:
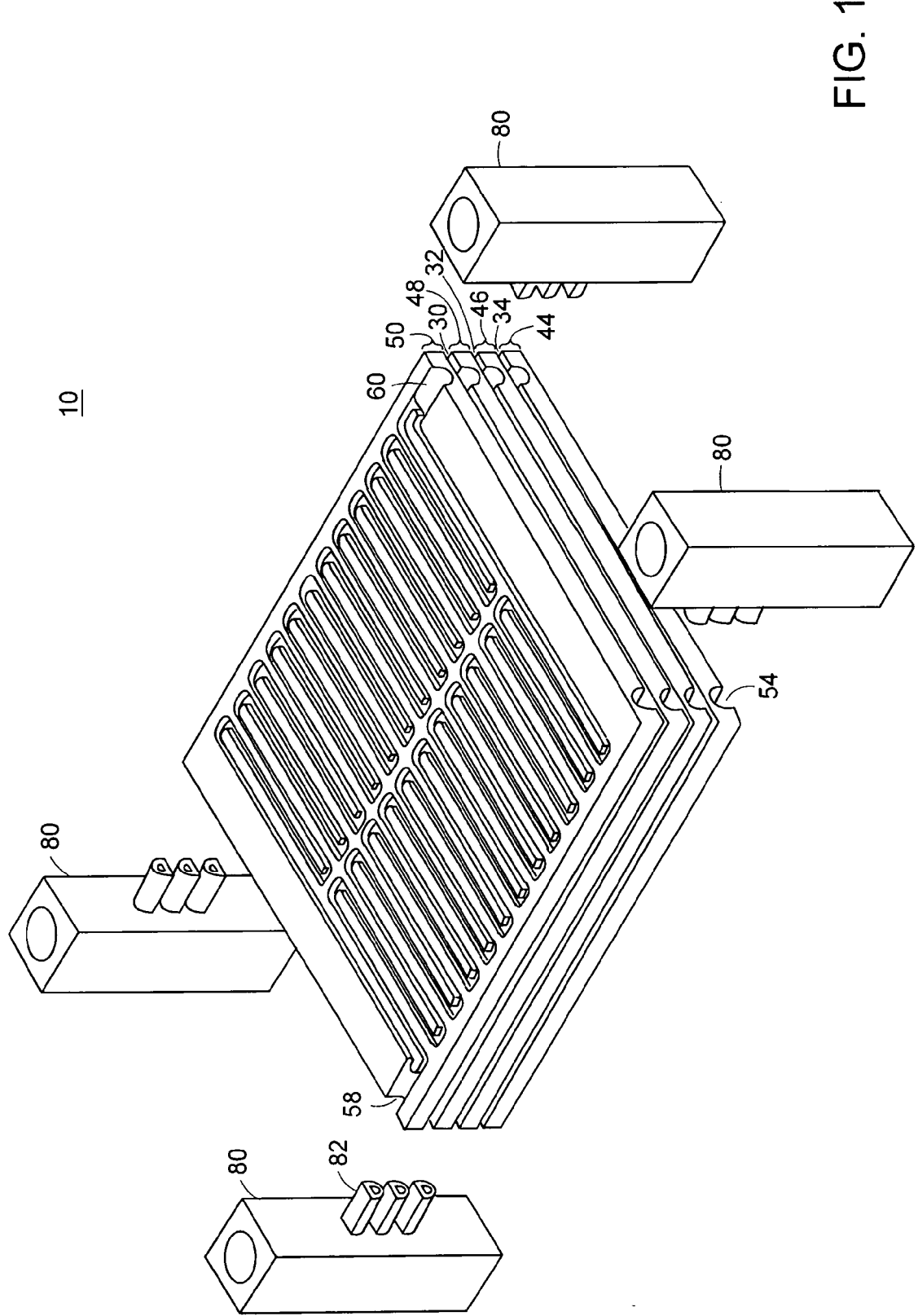
FIG. 1 is an exploded view of one embodiment of a fuel cell of the present invention which shows an assembly of a 3 cell fuel cell stack with 3 MEAs and 4 bipolar plates, and external manifolds corresponding to fuel in, fuel out, oxidant in, oxidant out.

The present invention provides a variety of cassettes suitable for use in electrochemical applications and ion exchange applications. As noted above, cassettes of the invention are particularly well suited for use in fuel cells.

The current innovation allows for use of an external manifold with the 'one shot' fabrication techniques previously described. In general, flow fields are employed with a minimum edge beyond the active area (e.g. 2–3 mm). The flow fields are open to the outside edge to provide at least one input for the respective reactants. In flow fields utilized for the cathode side of a fuel cell at least one input and one output are provided. Similarly, cooling flow fields can be employed that have at least one input and one output opening on the outside edges. Flow fields can be made from metal or carbon composites, or other materials compatible with the function of the fuel cell. A bipolar configuration of the flow field can also be utilized that includes two flow fields on either side of a single component. Membrane electrode assemblies are cut to nominally the same size and dimensions as the flow fields. The flow field and MEA components are layered together specific to the stack design (including the number of cells, number and placement of the cooling layers, etc.). These components are roughly aligned such that the MEA active area is exposed to the necessary flow fields (either within bipolar plates or as separate pieces) to form an assembly. This assembly can include any number of cells and cooling layers consisting of the necessary flow field components and MEAs relatively assembled. The resulting assembly can be held together via a clamping force for the remainder of the process.

In certain preferred aspects, the present invention provides an electrochemical cassette comprising at least one electrochemical cell which comprises: a membrane electrode assembly (MEA), a reductant flow field, an oxidant flow field, a separator plate, at least one reductant external manifold and at least one oxidant external manifold, wherein each flow field comprises at least one opening extending through the periphery of the flow field and each external manifold comprises a primary manifold and at least one port capable of coupling to the peripheral openings in the flow field to which the external manifold is intended to deliver material, wherein the one or more MEA, oxidant flow field, reductant flow field, separator plate, oxidant external manifold, and reductant external manifolds are assembled and encapsulated about the periphery thereof by a sealant.

In a preferred embodiment, the external manifold comprises a primary manifold which consists of a single conduit having a substantially uniform cross section along the length thereof. More preferably each reductant external manifold and each oxidant external manifold comprises at least one port capable of mating to peripheral openings of an equal number of flow fields to which the manifold is intended to deliver or remove material and more preferably each external manifold has at least two ports capable of mating to peripheral openings of an equal number of flow fields. Although other arrangements are contemplated, for ease of assembly and simplicity of design, it is generally preferred that the external manifold comprise a plurality of ports arranged in a substantially linear array.

Figure 3:
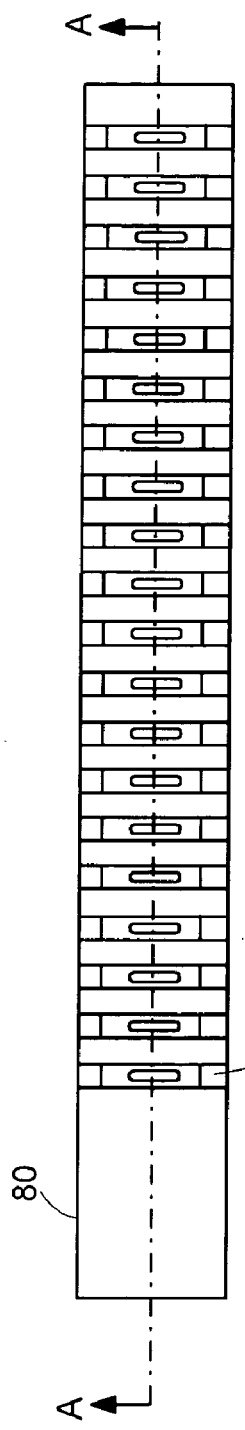
FIG. 3 is a schematic diagram of the external manifold including parts for sealing the manifold to the flow field apertures.
Figure 3A:
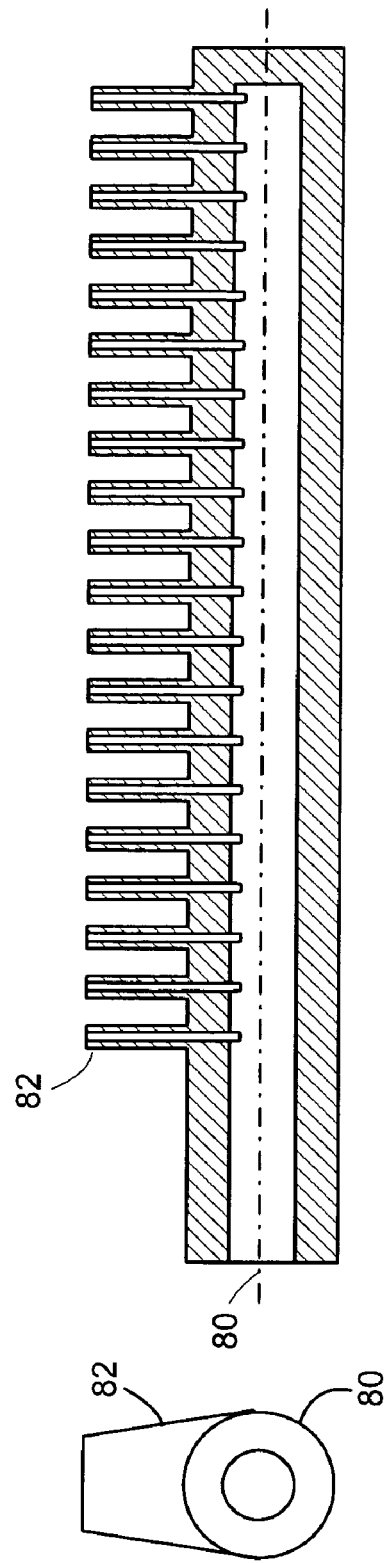
Figure 3B:
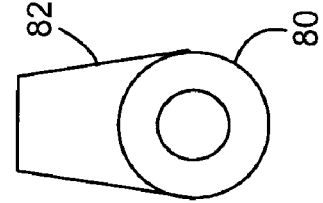
Figure 4:
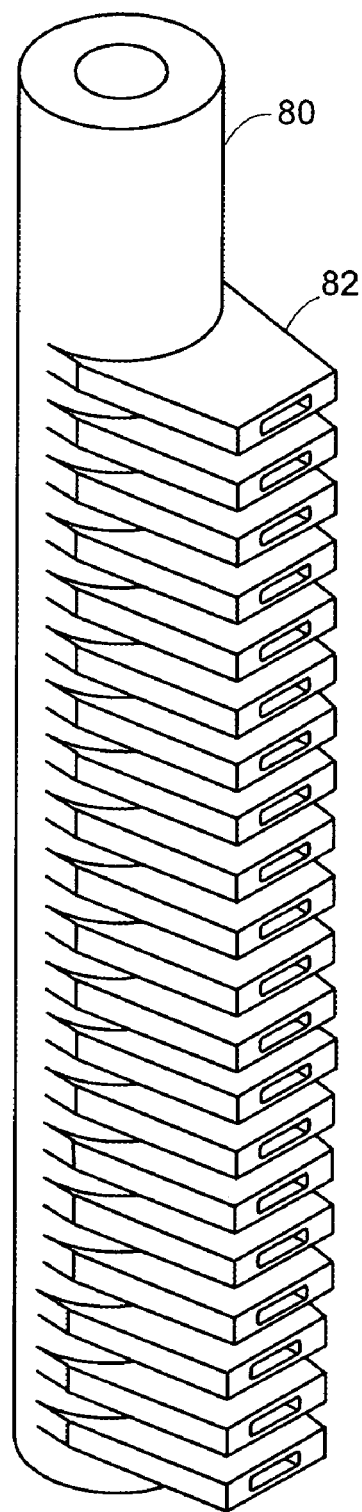
FIG. 4 is another schematic diagram of the external manifold including parts for sealing the manifold to the flow field apertures.
Figure 6:
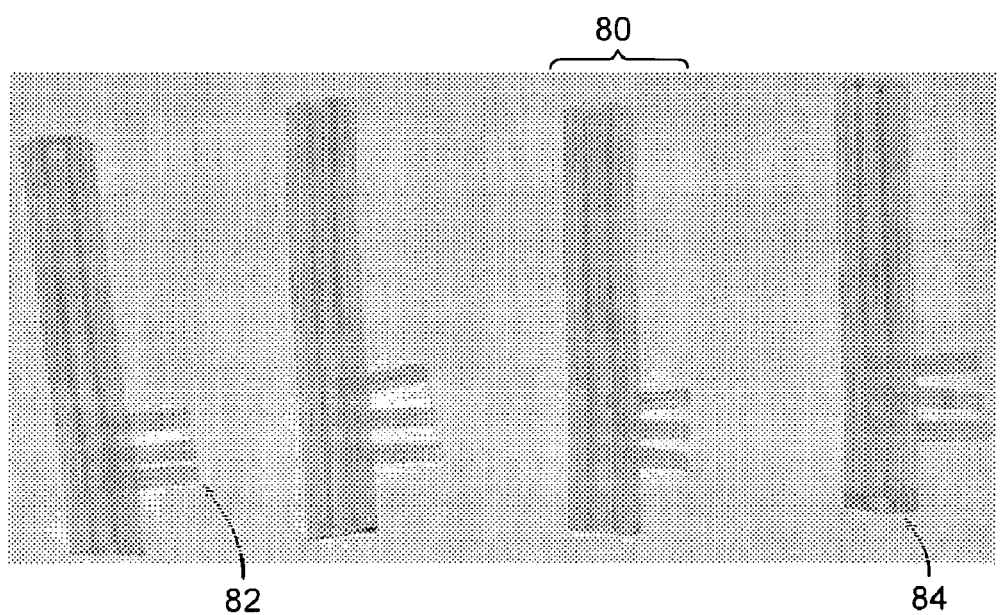
FIG. 6 is a photograph of an external manifold constructed from a plurality of tubing sections.
Figure 7:
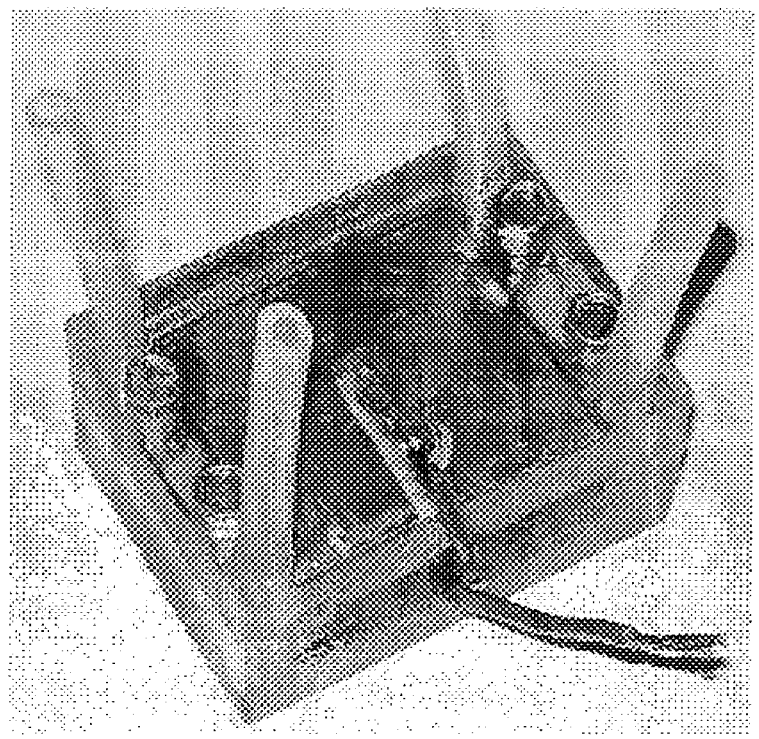
FIG. 7 is a fuel cell comprising the external manifolds depicted in FIG. 6.
Figure 9:
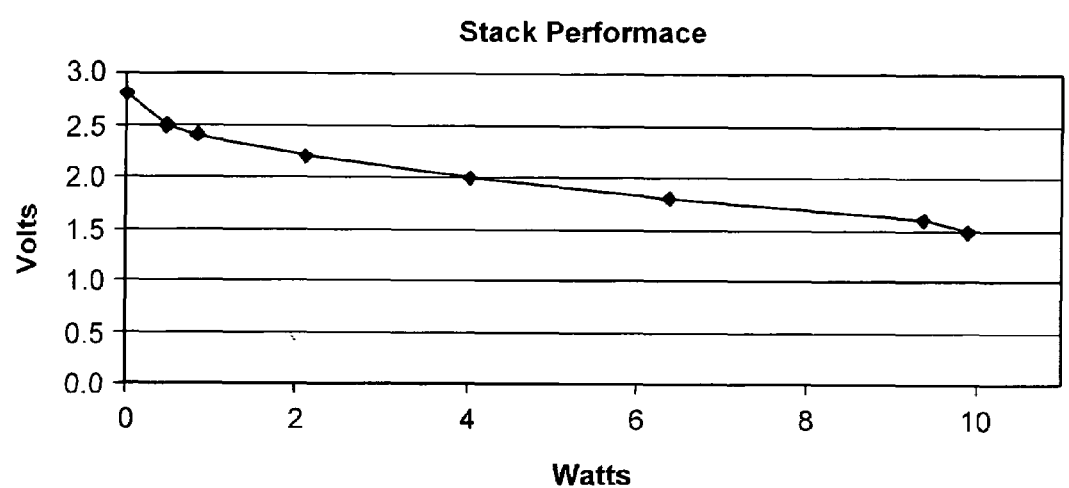
FIG. 9 is a plot of the voltage against watts for the fuel cell prepared in Example 1.

In another preferred embodiments, each external manifold (e.g., each external coolant, reactant and oxidant manifold) comprises a single article having a substantially homogenous composition, wherein each manifold comprises the primary manifold and at least two ports capable of mating to peripheral openings of an equal number of flow fields to which the manifold is intended to deliver or remove material. Thus, as depicted in FIGS. 3, 4, and 6, each external manifold comprises a primary manifold 80 and a plurality of ports 82 which are aligned in a substantially linear array. In certain embodiments it may be desirable to combine two or more external manifolds into a single housing such that each manifold is fluidly segregated and arranged to interact with separate arrays of peripheral openings in the assembled stack of MEAs/bipolar plates or MEAs/flow fields/separator plates.

Typically the ports of the external manifolds and peripheral openings of the assembled stack of MEAs/bipolar plates or MEAs/flow fields/separator plates are mated together to fluidly connect each manifold to the flow fields to which they are intended to deliver (or remove) material. After assembly, a sealant resin is introduced which contemporaneously seals the junction between the ports of the external manifolds and the peripheral openings of the flow fields to which the manifold is intended to deliver a material and encapsulates the periphery of the assembled cassette.

In electrochemical cassettes of the invention which comprise a plurality of MEAs or in which the electrochemical reaction generates a substantial amount of heat, it is generally desirable to incorporate one or more coolant flow fields into the electrochemical cassette to dissipate heat generated during operation of the cassette. Thus, in certain embodiments, the electrochemical cassette further comprises at least one coolant flow field wherein each coolant flow field comprises at least two opening extending through the periphery of the coolant flow field and at least two coolant external manifolds, each comprising a primary manifold and at least one ports capable of coupling to the peripheral openings in the coolant flow field. Although other arrangements are suitable for certain applications, the coolant flow field is typically interposed in between sets of between about 1 and about 8 MEA layers, or more preferably between sets of 2, 3, 4, 5, or 6 MEA layers. In electrochemical cassettes comprising at least one coolant flow field, each reductant external manifold and each oxidant external manifold comprises a primary manifold conduit and at least one port capable of mating with peripheral openings of an equal number of flow fields to which the manifold is intended to deliver material; and each coolant external manifold comprises a primary manifold conduit and at least one port capable of mating to peripheral openings of an equal number of coolant flow fields.

To the clamped assembly of fuel cell components, separate manifold pieces are added to connect all the openings corresponding to a particular reactant input or output on each of the layers. These manifold pieces can be machined from a solid stock, cast from any number of materials, or molded from a suitable resin such as depicted, for example, in FIG. 3 and FIG. 4, manufactured from a plurality of hoses, pipes or tubes as depicted in FIG. 6, or the like. In general, these manifold pieces need to fit snuggly to each of the stack components with which it interfaces. The externally manifolded stack assembly is placed within a cavity mold and a resin is introduced around the components. The resin is driven into the edges of the stack assembly either by pressure applied from the outside of the stack, or by a vacuum applied to the stack internal (i.e. through each of the manifolds). Once hardened, either by cooling of a thermoplastic resin or curing in the case of a thermoset resin, the encapsulated fuel cell stack can be removed from the mold. The resin serves both to seal the edge of each MEA, as well as to bind together all of the stack components, including the manifold pieces.

The final encapsulation can also include end plates and current collector pieces allowing for further integration of the assembly process, as well as reliability of the end product. End plate components can include features to compress the stack component parts, either before or after the encapsulation steps. Because the fuel cell is fabricated without the need for separate gaskets, the compression required is only a fraction of that in a traditional fuel cell stack, and is used to maintain good electrical contact.

Fuel cells of the present invention provide several advantages over conventional devices which include, but are not limited to the following:

The majority of the component area is actively used in the assembly, i.e. only a small portion is used in the sealing/manifolding of the stack, such that at least 80% or more preferably between 85% and about 95% of the MEA cross-section is actively used for the electrochemical reaction.

Continuously coated MEAs can be readily used (i.e. compatible with roll-to-roll processing of MEAs).

Encapsulation of all the components within the stack provides robust product.

Component pieces can be fabricated with very relaxed tolerances as sealing does not require gaskets and compression.

Reducing or preventing corrosion in the stack by segregating the reactant streams from the end plates or collector plates.

Reducing or preventing problems associated with exposure of the MEA to non-aqueous coolants by segregating the coolant streams from the composite MEAs.

Preferably, all of the fuel cell components are cut to roughly the same shape perimeter. In preferred embodiments the MEA layer is a solid sheet without cuts or other holes or channels through the thickness thereof, the bipolar plate(s) have one or two flow fields on opposing faces, and at least two apertures per flow field about the periphery of the bipolar plate which are open to each flow field. Preferably the apertures are capable of coupling to a port in an external manifold to form a fluid tight seal, e.g., a gas and/or liquid tight seal.

Due to the porous nature of the gas diffusion layer (GDL) of the MEA, sealant introduced into the periphery of the MEA and bipolar plate interpenetrates the GDL to seal the MEA and the bipolar plate together and seals the bipolar plate aperture to the port of the external manifold. In conventional processes, the polymer membrane is often required to extend past the GDL to provide a frame for sealing purposes. Consequently, this results in increased manufacturing costs. In contrast, in accordance with the present invention, sealing is achieved with a GDL and polymer membrane that are of substantially the same size and shape. This is advantageous as the MEAs used in the present invention may be fabricated on a continuous basis with the associated reduction in manufacturing costs.

FIG. 2 shows a preferred embodiment of a bipolar plate 50 having flow field grooves 52 cut therein. Alternatively, the flow field may be formed by screen or other porous material in conjunction with a separator plate to form the flow field. These flow field grooves 52 are designed such that a reagent or coolant introduced in the flow field is uniformly distributed about the field. Moreover, the flow field grooves are open to at least two apertures 54 and 56 on the periphery of the bipolar plate 50 such that a reagent or coolant can be introduced into and removed from the flow field through two or more external manifolds (80).

The components are assembled according to the desired cassette design and output requirements. Assembly of a fuel cell stack 10 utilizing bipolar plates requires the use of terminal plates which incorporate one-half of a bipolar plate structure, i.e. only one flow field face. In a simple bipolar assembly design 10, as shown in FIG. 1, MEA layers (30, 32, and 34) are interposed between bipolar plates 44, 46, 48, and 50. External manifolds 80 are then coupled to the stack of alternating MEA and bipolar plates where the apertures 54, 56 (not shown), 58, and 60 of the bipolar plates couple with the ports 82 of the external manifold 80 to form a seal. Typically a fluid tight seal between aperture and port is formed by application of vacuum to the external manifold and flow field during the sealing process. However other means of sealing the apertures and ports during the encapsulation process are also contemplated. Additional bipolar plates and MEAs maybe added to the cassette assembly with or without the addition of cooling layers depending upon the output requirements for the finished fuel cell.

Figure 5:
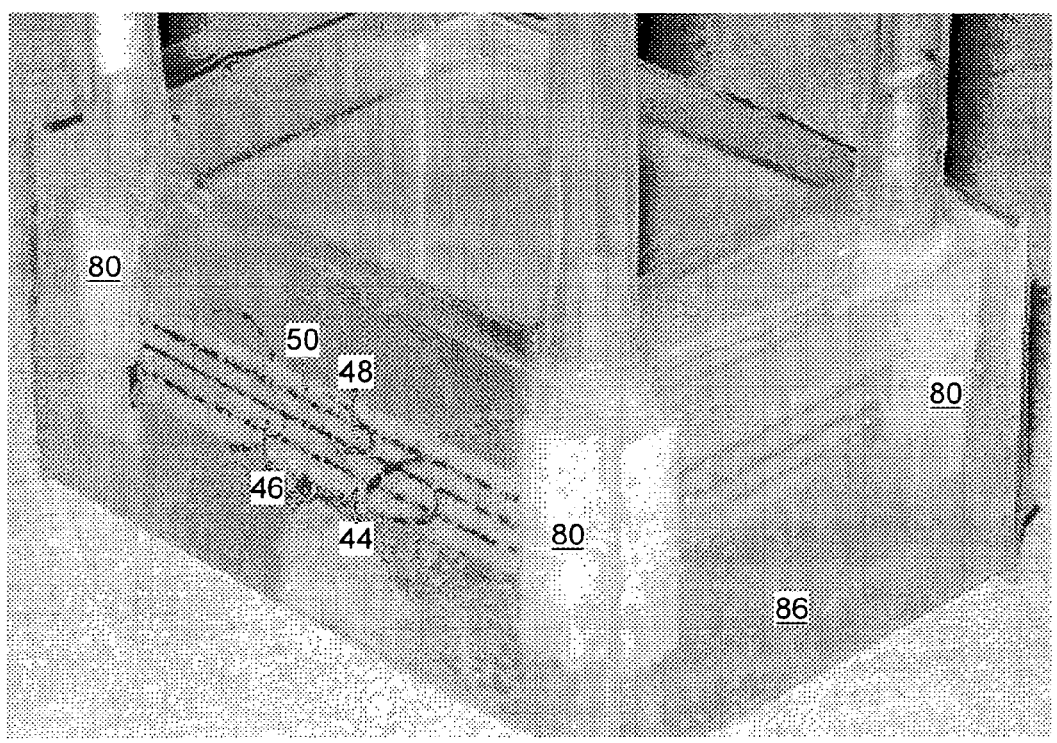
FIG. 5 is photograph of a test of the external design according to the parts shown in FIGS. 1 and 6.

FIG. 5 shows a photograph of the sealed fuel cell stack 10, described in FIG. 1. Bipolar plates 44, 46, 48, and 50, and external manifolds 80, are sealed externally by the sealant 86.

FIG. 6 shows another preferred embodiment of an external manifold 80 having three ports 82 provided in a primary manifold 84. The external manifold of FIG. 6 is assembled by providing a primary manifold tube, hose, or pipe, placing a series of openings through the side wall of the primary manifold and inserting hosing, pipes or tubings for the ports in the openings. Preferably the port tubing inserted into the manifold openings has substantially the same diameter such that the connection between the ports and the primary manifold is fluid tight or is fluid tight after encapsulating the fuel cell with resin. Although any material which is chemically stable to the sealant and the reactants, e.g., oxidant and/or fuel, are suitable for use in the preparation of the external manifold opening, preferred materials are non-conducting resins which have are sufficiently flexible to facilitate stack assembly. Typically preferred manifold materials are selected from silicone, TEFLON (polytetrafluoroethylene), polyethylene, TYGON tubing, butyl rubber, and the like.

For use in fuel cell applications, cassettes of the invention are typically utilized in the form of a stacked assembly comprising the following components: membrane electrode assemblies (MEA), flow fields, separator plates and external manifolds. Preferably the stacked assembly is then encapsulated in a resin to bind the MEA and separator plates and to seal the external manifolds to the separator plates forming a conduit between the manifolds and at least some of the flow fields. In preferred embodiments, one or two flow fields and a separator plates are provided in a single bipolar plate which is then stacked with MEA layers and other bipolar plates.

In certain applications, particularly where an increased amount or more homogeneous distribution of material to flow fields is desired, the invention contemplates electrochemical cassettes, in which, flow fields are in fluid contact with two or more material delivering external manifolds and two or more exhaust manifolds. The electrochemical cassette designs provided herein provide for multiple manifold-flow field connections, in part because of the ease of cassette assembly and the low cross-sectional area required for the flow field opening to individual external manifolds. Thus, the cassettes of the invention may in certain instances incorporate a plurality of material delivery and/or exhaust external manifolds which are in fluid contact with each flow field of the stack.

Although exemplary assembly designs have been described, those skilled in the art will recognize that fuel cells can have any desired number of components assembled together depending upon the output requirements of the final fuel cell cassette. Regardless of the particular design, the components are assembled to meet the requirements of the finished fuel cell. In each case, external manifolds having ports which are of a size and alignment suitable for coupling to each of the apertures to equivalent flow fields in each of the bipolar or separator plates are then aligned with the stack assembly to form a seal with each of the flow fields.

To seal the fuel cell cassette assembly described above using vacuum resin transfer molding techniques, a sealant is introduced around the perimeter of the assembled components. A vacuum is pulled through each of the external manifolds within the assembly. The pressure differential pulls sealant into the edges of the assembly thereby sealing the periphery of the components in the assembly together and forming the assembly into a finished fuel cell cassette. Sealant also permeates the GDLs of the MEAs. The perimeter sealing is complete when the sealant blinds the adjacent portions of the MEA.

To seal a fuel cell cassette using injection-molding techniques, sealant would be injected around the periphery of the assembly including the external manifolding using a driving pressure means. The sealant is not introduced into the interior conduits of the external manifolds or into the flow fields which are open to the interior conduits of the external manifolds. In the preferred embodiment, a thermoplastic resin is utilized as the sealant around the edges of the assembly and allowed to cool and harden prior to removal of the fuel cell cassette from the mold. A mold capable of accommodating the associated temperature and pressure is utilized. Alternatively, a thermoset resin can be used in the same manner; curing with any suitable combination of time and temperature.

The pressure differential and time required to accomplish the sealing process is a function of the materials used in the fuel cell cassette construction. These include the viscosity and flow characteristics of the resin, and the type of gas diffusion layer used in the MEA. Those skilled in the art will be able to judge the appropriate time and pressure based on these parameters. Those practicing the invention may also ascertain the most appropriate time and pressure by visual inspection during the sealing process.

The resin or sealant used for encapsulation is selected such that it has the required chemical and mechanical properties for the conditions found in an operating fuel cell system (oxidative stability, for example). Appropriate resins/sealants include both thermoplastics and thermoset elastomers. Preferred thermoplastics include thermoplastic olefin elastomers, thermoplastic, polyurethanes, plastomers, polypropylene, polyethylene, polytetrafluoroethylene, fluorinated polypropylene and polystyrene. Preferred thermoset elastomers include epoxy resins, urethanes, silicones, fluorosilicones, and vinyl esters.

In certain preferred embodiments, endplates are bonded directly to the stacked assembly of MEA layers and bipolar plates during the sealing steps described above. Alternatively, the end plates can be modified bipolar plates having a flow field on one surface and electrical leads and/or various adapters on the other surface. Several benefits result from the use of this embodiment. Removing the compression seal between the fuel cell cassette and conventional end plates improves the reliability of the fuel cell stack and substantially decreases the weight. Also, the incorporated end plates can include a variety of fittings to further simplify the fuel cell stack.

In a preferred embodiment of the invention, vacuum assisted resin transfer molding is used to draw the sealant (introduced from the external edge outside the stack) into the peripheral edges of the MEAs and around bipolar plates. Preferably the sealant forms a non-porous composite with that portion of the GDL in contact with the external edge of the MEA and with the bipolar plate such that the seal is liquid or gas tight. This embodiment of the invention is preferred in that it offers ease in terms of manufacturing and is therefore a preferred sealing means for large volume manufacture of fuel cell cassettes.

Preferred composite membrane electrode assemblies suitable for use in the fuel cell cassettes of the invention comprise a laminated membrane electrode assembly including membrane, catalyst layers and gas diffusion layers. Suppliers include 3M, DuPont, Johnson Matthey, W.L. Gore, and Umicore.

Preferred cassettes suitable for use in electrochemical and fuel cell applications further include at least two current collectors which are preferably integrated into the endplates. Thus, in preferred cassettes, at least a portion of one of the end plates is composed of an electrically conductive metal or metal alloy. More preferably, at least a portion of one of the end plates is a copper current collector. The means by which the end plates and fuel cell cassettes are assembled to form the fuel cell stack provided by the present invention is not particularly limited and may include compression gasket seals and co-encapsulation in a resin and/or sealant. In preferred embodiments, the end plate is assembled with the fuel cell cassette prior to encapsulation by the resin and prior to introduction of the sealant such that the end plate and fuel cell cassette are encapsulated and sealed in combination, e.g., simultaneously.

In other preferred embodiments of the present invention, one or more fuel cell cassettes are manufactured, then aligned in a stack together with one or more compression gaskets and end plates. Compression means such as through bolts, tie downs or other mechanical fasteners are attached to the fuel cell stack to mechanically seal the fuel cell cassettes and end plates.

In preferred embodiments, the external manifolds of individual cassettes are capable of forming liquid or gas tight seals with adjacent external manifolds of other cassettes.

The layer size and number of layers in the cassettes and stacks of the invention are not particularly limited. Typically each flow field and/or membrane assembly will be between about 1 cm$^2$ and about 1 m$^2$. However, as will be appreciated by the skilled artisan, larger and smaller flow field layers and/or membrane assembly layers may be suitable in certain applications. The layer size and number of layers the fuel cell cassettes and fuel cell cassettes of the invention are capable of producing a sufficient power supply for a variety of applications. Frequently, the power output of fuel cell cassettes and fuel cell stacks of the invention will range from about 0.1 W to about 100 kW, or more preferably, from about 0.5 W to about 10 kW.

Preferred fuel cell cassettes of the present invention are further illustrated by means of the following illustrative embodiment, which is given for purpose of illustration only and is not meant to limit the invention to the particular components and amounts disclosed therein.

EXAMPLE 1

Bipolar plates were machined from carbon-polymer composite as shown in FIG. 2. MEAs were cut from a larger sheet to nearly the same dimensions as the bipolar plates. Three MEAs and four bipolar plates were assembled into a stack such that a fuel and an oxidant flow fields were on each side of every MEA. Copper sheet current collectors were cut from sheet stock and leads were soldered to the current collectors. Manifold tubes were assembled from silicone tubes of varying diameters according to FIG. 6. The manifold pieces were added to the stack assembly such that the small tubes fit into each of the plates connecting each flow field to the according manifold. Each the fuel and oxidant have an inlet and outlet manifold.

End plates were fashioned from polycarbonate slightly larger than the bipolar plates. Endplates, current collectors and the stack components were assembled and fastened together with bolts through the endplates (external to the fuel cell components).

The assembled components were surrounded by a paper mold. The mold was filled with a two-part silicone (SILAS- TIC (silicone) T2—Dow Corning) to surround the component. A vacuum of 10 inches Hg was pulled through the manifolds simultaneously for approximately 30 sec. drawing the silicone into the edge of each MEA, as well as into the spaces between the manifolds and the other stack components. The assembly and mold were heated in a convection oven (~200 F) until the silicone was hardened. The resulting stack was cut from the mold.

The stack was tested under typical fuel cell conditions. Hydrogen was dead-ended into the stack (with a short purge). Air, humidified at 50 C, was flowed through the stack at 2–5 equivalents.

TABLE 1

Fuel cell data for stack prepared and tested in Example 1.

| V | V/Layer | C | mA/cm$^2$ | mW/cm$^2$ | Watts |
|---|---------|------|------|------|-------|
| 2.8 | 0.94 | 0 | 0 | 0 | 0 |
| 2.5 | 0.83 | 0.19 | 14 | 12 | 0 |
| 2.4 | 0.80 | 0.34 | 25 | 20 | 1 |
| 2.2 | 0.73 | 0.96 | 71 | 52 | 2 |
| 2.0 | 0.67 | 2.02 | 149 | 99 | 4 |
| 1.8 | 0.60 | 3.54 | 261 | 157 | 6 |
| 1.6 | 0.53 | 5.85 | 431 | 230 | 9 |
| 1.5 | 0.50 | 6.6 | 487 | 243 | 10 |

The foregoing description of the present invention is merely illustrative thereof, and it is understood that variations and modification can be made without departing from the spirit or scope of the invention.

EXAMPLE 2

The following example demonstrates certain aspects of the external manifold design of the present invention. As a comparative analysis, several differences (improvements) over an internally manifolded stack also are described.

Increased MEA utilization. An internally manifolded stack was formed in accordance with the methods described in WO 03/036747. That stack had an active area of 11.5 cm$^2$ and a footprint of 22.3 cm$^2$ for a utilization of 52%. In contrast, utilizing an externally manifolded stack assembly formed in accordance with the invention, for the same 11.5 cm$^2$ active area, the MEA utilization was 13.0 cm$^2$ for a utilization of approximately 89%. (For an illustration thereof, see FIGS. 8A/8B)

Decreased Cell Size and Weight. For the internally manifolded stack, volume for a 10 cell 11.5 cm$^2$ active area stack is 108 cm$^3$ (4.5 cm×6.5 cm×3.7 cm). For the externally manifolded assembly, the target volume for the same 10 cell 11.5 cm$^2$ active area stack is 75 cm$^3$ (4.5 cm×4.3 cm×3.9 cm) which corresponds to a 30% decrease in volume. The stack weight will decrease roughly in proportion with stack volume, e.g., in this example, from 201 g to 141 g.

Simplified design for Injection Molding. The internally manifolded design requires that the channels be filled with resin during the molding process. Channels fill easily when low-pressure (<5 psi) resin transfer molding techniques are used. For injection molding to be practical, higher pressures will be required to overcome the resistance of resin flow in the thin sealing channels. Such injection pressures may also cause damage to the MEA layers. With the external manifold design there are no channels, and only an exterior cavity around the outside of the cell needs to be filled with resin. Therefore, the external manifold design is well suited for both low-volume, low-pressure resin transfer production and very high volume, high-pressure, automated injection molding production; without any re-design being required.

Corrosion Resistance. The external manifold design will isolate the fuel, oxidant and cooling streams from the current collector/endplate. One common failure mode for fuel cells is corrosion of the current collector by the gas and fluid flows. In the external manifold design the gas and fluid flows will come in contact only with the manifolds, MEAs and bipolar plates. All of these components are corrosion resistant and will not have the degradation that occurs to metal current collectors (typically copper, stainless steel, or aluminum, each of which may be optionally plated).

What is claimed is:

1. An electrochemical cassette comprising at least one electrochemical cell which comprises:
   a membrane electrode assembly (MEA), a reductant flow field, an oxidant flow field, a separator plate, at least one reductant external manifold and at least one oxidant external manifold, wherein each flow field comprises at least one opening extending through the periphery of the cell and each external manifold comprises a primary manifold and at least one port capable of coupling to the peripheral openings in the flow field to which the external manifold is intended to deliver material;
   wherein the MEA, oxidant flow field, reductant flow field, separator plate, the at least one oxidant external manifold, and the at least one reductant external manifold are assembled and encapsulated about the periphery thereof by a sealant.

2. The electrochemical cassette of claim 1, wherein each external manifold comprises a primary manifold which consists of a single conduit having a substantially uniform cross section along the length thereof.

3. The electrochemical cassette of claim 1, wherein each reductant external manifold and each oxidant external manifold comprises at least one port capable of mating to peripheral openings of an equal number of flow fields to which the manifold is intended to deliver or remove material.

4. The electrochemical cassette of claim 1, wherein each reductant external manifold and each oxidant external manifold comprises at least two ports capable of mating to peripheral openings of an equal number of flow fields to which the manifold is intended to deliver or remove material.

5. The electrochemical cassette of claim 1, wherein each reductant external manifold and each oxidant external manifold comprises between 2 and 100 ports capable of mating to peripheral openings of an equal number of flow fields to which the manifold is intended to deliver or remove material.

6. The electrochemical cassette of claim 3, wherein each port of the external manifold are arranged in a substantially linear array.

7. The electrochemical cassette of claim 1, wherein each reductant external manifold and each oxidant external manifold comprises a single article having a substantially homogenous composition, wherein each manifold comprises the primary manifold and at least two ports capable of mating to peripheral openings of an equal number of flow fields to which the manifold is intended to deliver or remove material.

8. The electrochemical cassette of claim 1, wherein the sealant contemporaneously seals the junction between the ports of the external manifolds and the peripheral openings of the flow fields to which the manifold is intended to deliver a material during the encapsulation process.

9. The electrochemical cassette of claim 1, wherein each MEA and each separator plate comprises no grooves, holes or other aperture extending through the entire thickness thereof.

10. The electrochemical cassette of claim 1, wherein cassette further comprises at least one coolant flow field wherein each coolant flow field comprises at least two openings extending through the periphery of the flow field and at least two coolant external manifolds each comprising a primary manifold and at least one port capable of coupling to the peripheral openings in the coolant flow field.

11. The electrochemical cassette of claim 10, wherein each reductant external manifold and each oxidant external manifold comprises a single component comprising the primary manifold conduit and at least two ports capable of mating with peripheral openings of an equal number of flow fields to which the manifold is intended to deliver material; and each coolant external manifold opening comprises a single component comprising the primary manifold conduit and at least one port capable of mating to peripheral openings of an equal number of coolant flow fields.

12. The electrochemical cassette of claim 1, wherein each external manifold comprises at least two primary manifolds and at least two sets of ports which are not fluidly connected such that each primary manifold and each set of ports can deliver or remove material to flow fields to which each primary manifold is intended to deliver or remove material.

13. The electrochemical cassette of claim 1, wherein a separator plate and one or two flow fields are integrated into a bipolar plate and each flow field peripheral opening extends through only a portion of the thickness of the bipolar plate.

14. The electrochemical cassette of claim 13, wherein cassette further comprises at least one coolant flow field wherein each coolant flow field comprises at least two openings extending through the periphery of the flow field and at least two coolant external manifolds each comprising a primary manifold and at least one port capable of coupling to the peripheral openings in the coolant flow field.

15. The electrochemical cassette of claim 14, wherein each bipolar plate has zero or one oxidant flow field, has zero or one fuel flow field, and zero or one coolant flow field.

16. The electrochemical cassette of claim 1, wherein each membrane electrode assembly is in contact with a fuel flow field and an oxidant flow field.

17. The electrochemical cassette according to any one of claims 1 through 15 wherein the electrochemical cassette is a fuel cell cassette.

18. The electrochemical cassette according to claim 14, wherein at least one bipolar plate comprises a coolant flow field.

19. The electrochemical cassette of claim 18, wherein a first bipolar plate comprises a first coolant flow field and a second bipolar plate which are aligned to form a coolant passage.

20. The electrochemical cassette of claim 1, wherein the external manifold is composed of a primary manifold and a plurality of ports disposed along the length thereof wherein the ports are aligned such that they form fluid tight seals with a plurality of peripheral openings in the flow fields which correspond to flow fields to which the external manifold is intended to deliver material.

21. The electrochemical cassette of claim 20 wherein the external manifold is machined from a resin, ceramic or metal, cast or molded from a thermoplastic or thermoset resin, or manufactured from a plurality of plastic or rubber tubing.

22. The electrochemical cassette of claim 21, wherein the external manifold is machined, cast, or molded from a thermoplastic or thermoset resin or manufactured from plastic or rubber tubing.

23. The electrochemical cassette of claim 22, wherein the external manifold is machined, cast, or molded from a thermoplastic material is selected from the group consisting of thermoplastic olefin elastomers, thermoplastic polyurethane, plastomer, polypropylene, polyethylene, polytetrafluoroethylene, fluorinated polypropylene and polystyrene.

24. The electrochemical cassette of claim 22, wherein the external manifold is machined, cast, or molded from a thermoset material is selected from the group consisting of epoxy resins, urethanes, silicones, fluorosilicones, and vinyl esters.

25. The electrochemical cassette of claim 22, wherein the external manifold is manufactured from tubing, hosing or piping selected from silicone, butyl rubber, poly(isoprene), copolymers of styrene and isoprene.

26. The electrochemical cassette of claim 13, wherein the bipolar plate is machined or molded out of at least one of a carbon/polymer composite, graphite or metal.

27. The electrochemical cassette of claim 13, wherein the bipolar plate is stamped from a metal sheet.

28. The electrochemical cassette of claim 1, wherein the sealant is introduced by pressure assisted resin transfer, by vacuum assisted resin transfer, or by injection molding.

29. The electrochemical cassette of claim 28, wherein the sealant or resin is introduced under a pressure differential of between about +15 psi and about −15 psi.

30. The electrochemical cassette of claim 28, wherein the sealant is introduced by pressure assisted resin transfer under a positive pressure of between 0 psi and about 500 psi.

31. The electrochemical cassette of claim 28, wherein the sealant or resin is introduced by vacuum assisted resin transfer under a partial pressure of between about 750 Torr and about 1 mTorr.

32. A fuel cell stack comprising:
   (a) at least one electrochemical cassette according to claim 1;
   (b) at least one end plate;
   wherein the end plate is assembled on the top and/or bottom of the stack of one or more electrochemical cassettes.

33. The fuel cell stack of claim 32, wherein the end plate is assembled with the electrochemical cassette(s) prior to encapsulation such that the end plate and fuel cell cassettes(s) are encapsulated and sealed in combination.

34. The fuel cell stack of claim 32, wherein a compression means is applied to the stack to provide compressive force to the fuel cell stack.

35. The fuel cell stack of claim 32, wherein the end plate is attached to one or more electrochemical cassettes after encapsulation of the electrochemical cassette(s).

36. The fuel cell stack of claim 35, wherein the end plate is attached by a compressive seal.

37. The fuel cell stack of claim 32, wherein at least one of the end plates is composed of a thermoset polymer, a thermoplastic polymer, a metal, or a metal alloy.

38. The fuel cell stack of claim 32, wherein at least one of the end plates is composed of a filled polymer composite.

39. The fuel cell stack of claim 38, wherein the filled polymer composite is a glass fiber reinforced thermoplastic or a graphite reinforced thermoplastic.

40. The fuel cell stack of claim 32, wherein at least a portion of one of the end plates is composed of an electrically conductive metal or metal alloy.

41. The fuel cell stack of claim 40, wherein at least a portion of one of the end plates is a copper current collector.

42. The electrochemical cassette of claim 1, wherein the membrane electrode assembly is a composite MEA.

* * * * *